Patented May 6, 1924.

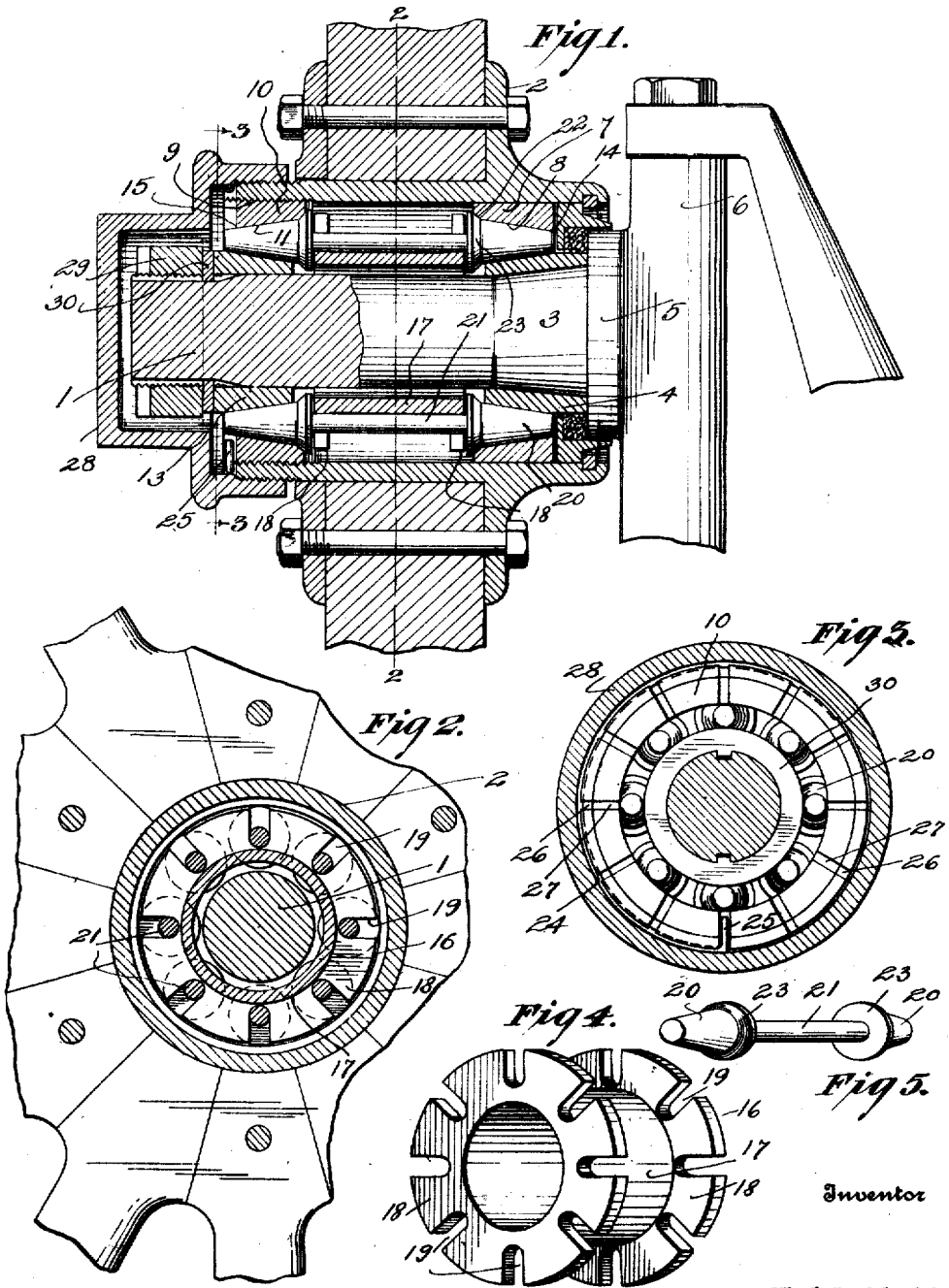

1,492,887

UNITED STATES PATENT OFFICE.

CHARLES E. McNUTT, OF CALDWELL, OHIO.

ROLLER BEARING.

Application filed May 16, 1922. Serial No. 561,411.

*To all whom it may concern:*

Be it known that CHARLES E. McNUTT, a citizen of the United States, residing at Caldwell, in the county of Noble and State of Ohio, has invented certain new and useful Improvements in Roller Bearings, of which the following is a specification.

The present invention is directed to improvements in roller bearings, and has for its primary object to materially simplify the construction of such devices by reducing the number of parts and necessarily the cost of manufacture.

A further object of the invention is to provide a bearing wherein the rollers are connected by rods, the rods being held in spaced circular alignment in a simple and efficient manner, the rollers being so related that their bearing surfaces may be conveniently adjusted to take up wear.

With these and other objects in view, as will appear as the description proceeds, the invention consists in the novel features of construction, combinations of elements and arrangements of parts, and hereinafter to be fully described and pointed out in the appended claims.

In the accompanying drawing:

Figure 1 is a longitudinal sectional view through the device,

Figure 2 is a sectional view on the line 2—2 of Figure 1,

Figure 3 is a sectional view on the line 3—3 of Figure 1,

Figure 4 is a detail perspective view of the retaining member, and

Figure 5 is a detail perspective view of a pair of the rollers.

Referring to the drawing 1 designates the axle and 2 the hub of a motor vehicle wheel, said axle terminating at its rear end in a tapered portion 3, and upon which is engaged a correspondingly tapered sleeve 4, the inner end thereof abutting against the annular flange 5 of the knuckles 6. Concentrically disposed with the sleeve 4 is a bushing 7 having a tapered inner wall 8 which corresponds to the taper of the sleeve 4.

The hub 2 is interiorly threaded, as at 9, and threaded therein is a bushing 10. The inner wall 11 having a taper similar to that of the wall 8 of the bushing 7, there being a concentrically arranged sleeve 13 engaged on the axle 1. This sleeve is tapered to correspond with the taper of the wall 11 of the co-acting bushing 9, the bushing 10 and sleeve 13 being assembled to provide a race 14, a similar race 15 being formed between the bushing 7 and sleeve 4.

A retaining member 16 is provided and consists of a collar 17 which is adapted to encircle the center portion of the axle 1, said collar having annular right angle terminal flanges 18 and in which are formed a plurality of radial slots 19, said slots being disposed in direct alignment, the purpose of which will appear later. The rollers 20 are cone shaped and are integrally connected at their major ends by rods 21, said rods being of such length as to have their ends rotatably engaged in the aligned slots 19, and at which time the rollers are positioned with their major ends adjacent the outer faces of the flanges 18, whereby said rollers are held against longitudinal movement. The respective rollers 20 are engaged in the races 14 and 15 and function in a manner well understood. The bushings 7 and 10 are formed respectively with beveled confronting shoulders 22 which are cooperatively associated with the annular flanges 23 carried by the rollers 20, said flanges being so arranged as to barely contact with the shoulders 22, but at the same time preventing the rollers and the rods from tilting if the bearing is not adjusted properly, or the parts wear.

The bushing 10 is held against accidental rotation by a spring wire frame 24 which has a finger 25 adapted to engage the registered grooves 26 and 27 formed respectively in the hub 2 and bushing. The frame 24 is held in place by the hub cap 28.

Threaded on the axle is a nut 29 which is adapted to force the sleeve 13 inwardly, and at times when it is desired to adjust the bearing, there being a washer 30 interposed between the nut and sleeve.

From the foregoing it will be apparent that a bearing has been provided wherein the number of parts have been materially reduced. Further it will be observed that the spaces between the rollers are unobstructed whereby grease or oil will be permitted to pass freely from one roller to another.

What is claimed is:

1. In a roller bearing, the combination with an axle, of races associated therewith, a collar encircling the axle and having flanges on its ends, said flanges having slots formed therein, rollers engaged in the races and rods connecting the rollers and engaged in the slots.

2. In a roller bearing, the combination with an axle, of concentrically arranged sleeves and bushings combined to form opposed races, a hub enclosing the races and engaged with the bushings, rollers engaged in the races, rods connecting the rollers, a collar encircling the axle and having terminal flanges and means carried by the flanges for engaging the rods to hold the same, and thus the rollers in against endwise movement.

3. In a roller bearing, the combination with an axle, of opposed concentrically arranged bushings and sleeves having tapered confronting faces combined to provide races, cone shaped rollers engaged in the races, rods connecting the rollers, means for holding these rods in spaced relation, a hub enclosing the races and a nut adjustable on the axle for engaging the adjacent sleeve to force the same inwardly, as and for the purpose set forth.

In testimony whereof I affix my signature.

CHARLES E. McNUTT.